June 25, 1940.    M. L. DEVOL    2,205,517
PROFILOGRAPH
Filed March 31, 1938    3 Sheets-Sheet 1

INVENTOR.
MANSON L. DEVOL
BY Bradley & Bee
ATTORNEYS.

June 25, 1940.  M. L. DEVOL  2,205,517

PROFILOGRAPH

Filed March 31, 1938  3 Sheets-Sheet 2

INVENTOR.
MANSON L. DEVOL

BY Bradley & Bee
ATTORNEYS.

June 25, 1940.    M. L. DEVOL    2,205,517
PROFILOGRAPH
Filed March 31, 1938    3 Sheets-Sheet 3

INVENTOR.
MANSON L. DEVOL
BY Bradley & Bee
ATTORNEYS.

Patented June 25, 1940

2,205,517

UNITED STATES PATENT OFFICE 2,205,517

PROFILOGRAPH

Manson L. Devol, Penn Township, Allegheny County, Pa., assignor to Pittsburgh Plate Glass Company, Allegheny County, Pa., a corporation of Pennsylvania Application March 31, 1938, Serial No. 199,304

14 Claims. (Cl. 73—51)

The present invention relates to apparatus for measuring and charting irregularities in surfaces and it has particular relation to apparatus for measuring and charting minute irregularities in relatively plane surfaces, such as plate glass and the like.

One object of the invention is to provide apparatus of the foregoing type which is compact, simple and rugged of design and which does not require an extensive amount of accurate and delicate machine work in construction.

A second object of the invention is to provide apparatus which will produce a greatly magnified and accurate record of small irregularities of the surfaces to be examined.

A third object of the invention is to provide apparatus for examining minute irregularities in plane surfaces by which a plurality of accurately spaced approximately parallel traces can be made for purposes of topographically surveying the surface.

A fourth object of the invention is to provide apparatus for making profilographic or topographic surveys of surfaces, in which the various elements of apparatus are disposed below its surface to be examined in such manner to admit of optical examination from above.

It has heretofore been observed that even relatively smooth surfaces such as those of sheet or plate glass contain minute depressions or elevations. In many cases, for example in studying the grinding and polishing of glass it is desirable to determine the size and shape of these irregularities. It has been proposed to make such observation by tracing over the surface with a diamond point or other fine point connected to a tiltable mirror in such manner that as the elevation of the point is varied in passing over the irregularities the mirror is caused to tilt. A beam of light projected upon the mirror is thus caused to trace a path which is a highly magnified reproduction of the vertical movements of the point. In one form of apparatus provided for making such observations the tiltable mirror is disposed above a trackway with the diamond point projecting downwardly and the plate to be examined is disposed upon a car moving upon the trackway in such manner that the diamond point travels along a path upon the upper surface of glass.

Such apparatus is objectionable in many respects. For example, irregularities in the trackway upon which the supporting car moves affect the movements of the diamond point and the mirror with which it is associated. Accordingly, provision of relatively complicated and expensive compensating apparatus is required. A second objectionable feature consists in the fact that the mirror and diamond point is disposed above the glass plate in such manner that optical observation of the surface adjacent to the point is difficult. Moreover, in order to obtain sufficient magnification of the movement of the diamond great distances between the moving mirror and the receiving screen are required.

In an apparatus constructed in accordance with the provisions of the present invention the foregoing difficulties are substantially obviated by mounting the plate to be examined upon a fixed support and then securing the mirror and the diamond point upon a horizontal beam mounted to rotate about a vertical axis in such position that the diamond point during rotation of the beam traces an arcuate path along the lower surface of the sample.

For a better understanding of the invention reference may now be had to the accompanying drawings in which Figure 1 is a plan view of a simple embodiment of the invention.

In the drawings like numerals designate like parts throughout.

Figure 1:
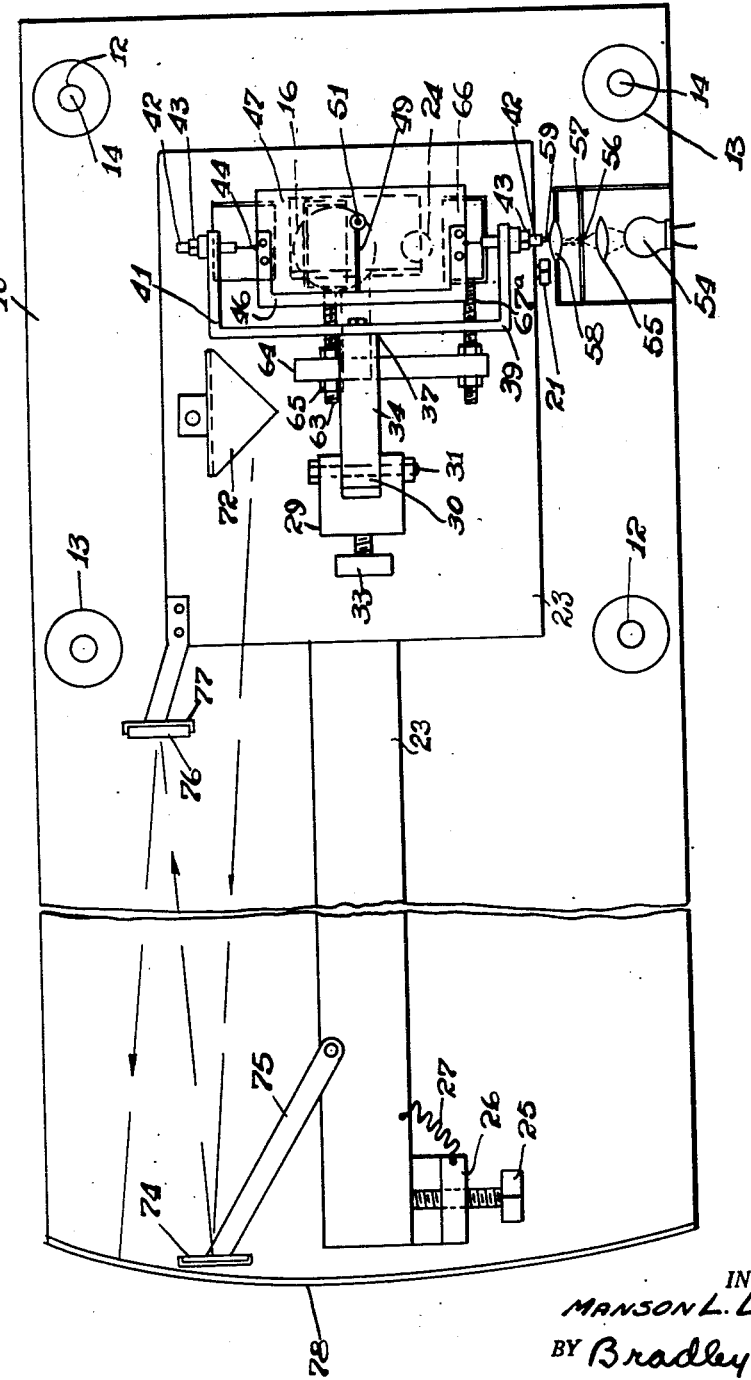

Apparatus constructed in accordance with the provisions of the present invention embodies a base 10 to which are secured vertical supports 11 (preferably four in number) into the upper extremities of which are threaded levelling screws 12 having knurled heads 13 and points 14 for supporting samples, e. g., plates of glass 15.

Figure 2:
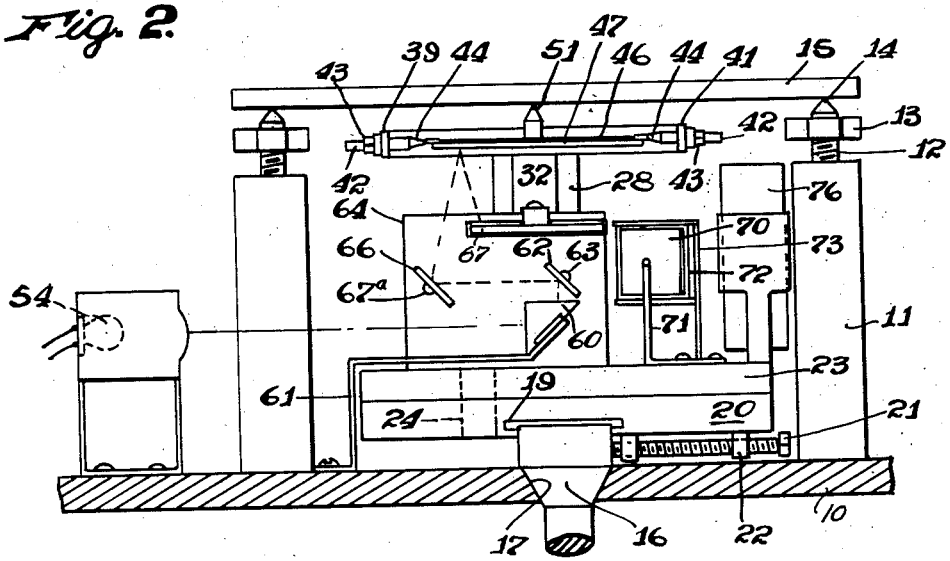
Figure 2 is a view partially in cross-section and partially in elevation of the invention as disclosed in Figure 1.
Figure 3:
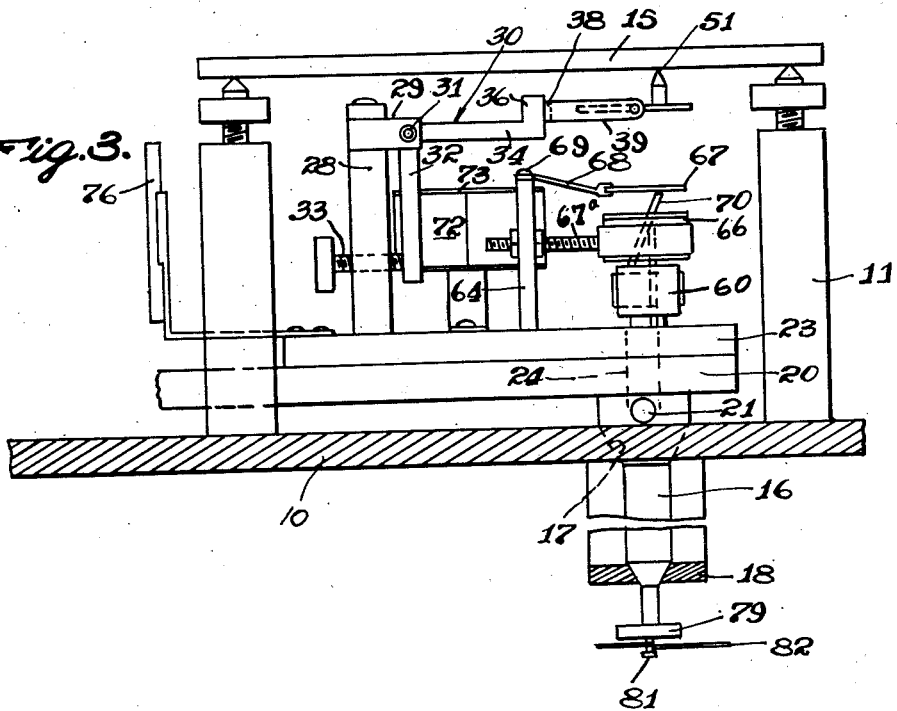
Figure 3 is an elevational view taken at right angles to the plane of Figure 2.

Vertical main shaft 16 of the profilograph is provided with cone-like bearings 17 in the base 10, and in a downwardly spaced horizontal bar 18. As shown in Figure 2 the upper extremity of the shaft is disposed for horizontal adjustment in a slot 19 of T shape cross-section in the lower surface of a main carrier beam 20. The beam may be clamped in any desired position of adjustment upon the shaft by any convenient means such as a screw 21 threaded through lugs 22 beneath the beam.

An auxiliary beam 23 is disposed upon beam 20 and rotates upon a pivot pin 24 which is secured in and projects upwardly from the latter. This pin preferably is spaced laterally with respect to the axis of shaft 16 and as shown in Fig. 1 beam 23 may be rotated about it by means of a screw 25 threaded through a bracket 26 of L shape, projecting from beam 20. Contact between the point of the screw and the auxiliary beam is secured by means of a helical spring 27, the extremities of which are respectively secured to the bracket and the auxiliary beam.

A vertical support 28 is mounted upon the auxiliary beam and at its upper extremity is provided with a horizontally-extending bifurcated bracket 29. A bell-crank lever 30 is journaled at its apex upon a pin 31 extending through the bracket and has a downwardly-extending arm 32, the position of which may be regulated by means of a set screw 33 threaded through support 28. Horizontally-extending arm 34 of the lever at its rear extremity is provided with an upwardly-projecting bracket 36 to which is secured the intermediate portion 37 of a yoke 38, having rearwardly-extending arms 39 and 41.

Cylindrical mirror supports 42 are journaled in the extremities of these arms and may be locked in any desired position or adjustment by convenient means such as lock nuts 43, upon opposite sides of the arms. At their inner extremities the supports are provided with inwardly-converging torsion wires or filaments 44 which are disposed in a vertical plane and at their inner extremities are secured in any convenient manner, e. g., by welding to, and resiliently support a flat bar 46 upon the back of a horizontal mirror 47 in such manner as to permit the mirror to tilt about an axis in a plane perpendicular or approximately perpendicular to the axis of rotation of the beam 20.

A wire-like bracket 49 is secured to the bar 46 and at its forward extremity supports a diamond point 51 in rearwardly offset relation with respect to the axis of shaft 16, and in laterally offset relationship with respect to the axis of rotation of the beam 23 upon the beam 20.

Figure 4:
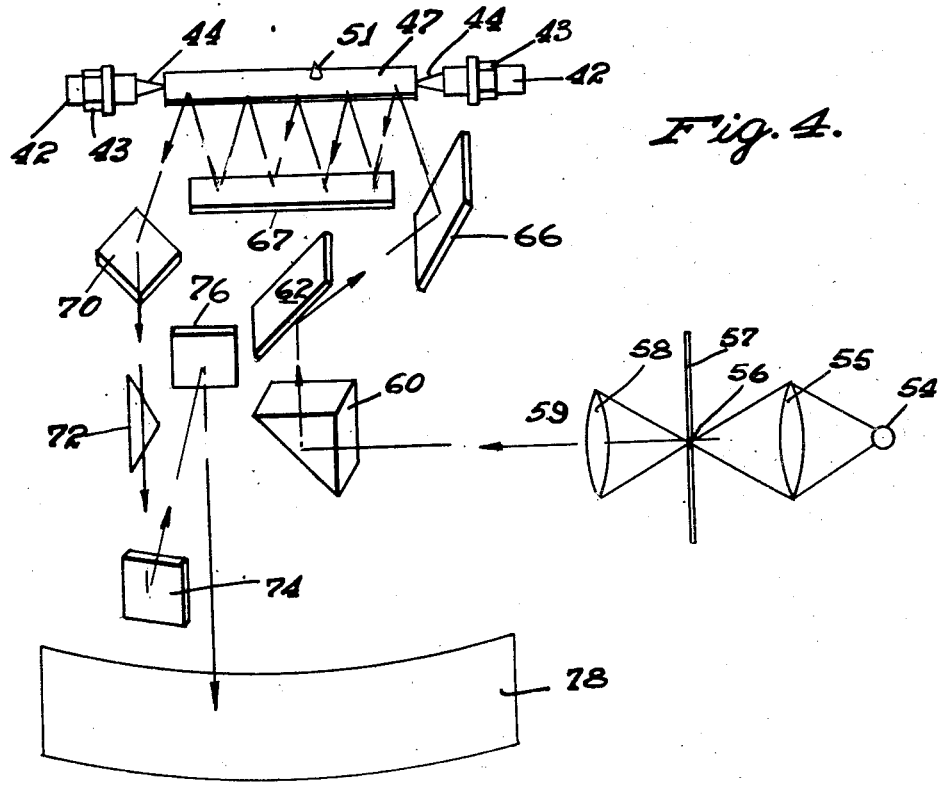
Figure 4 illustrates diagrammatically the optical system embodied in the apparatus.
Figure 5:
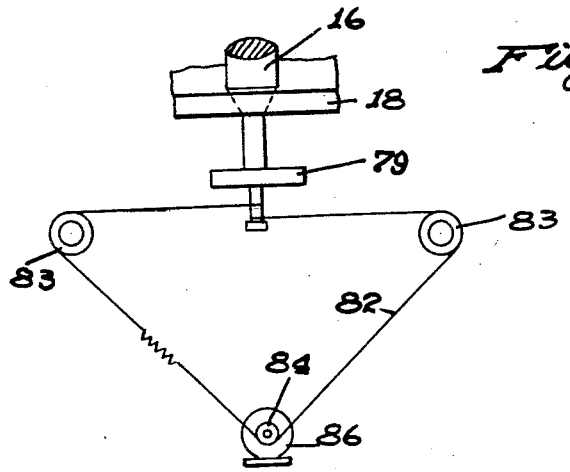
Figure 5 is a detailed view of a simple means for actuating the apparatus.

A system for projecting a beam or ray of light upon the tiltable mirror 47 comprises a source of light 54 (see Fig. 4), a condensing lens 55 for concentrating the diverging light from the source upon a pinhole 56 in a screen 57 disposed at the focus of the lens. A second lens 58 is disposed in advance of the screen 57 and functions to project the light passing through the pinhole as a converging beam progressing in the direction 59. This beam is projected upon a prism 60 disposed upon a bracket 61, which is secured upon base 10, and which is bent to support the prism directly above the shaft 16. The prism deflects the beam coaxially with the shaft against a mirror 62, disposed directly above the prism and of sufficient size to intercept the light from the prism regardless of the position of beams 20 and 23. The mirror is secured upon the rear extremity of a horizontal arm 63 which extends through an opening in a plate-like vertical support 64 and the arm is adjustably clamped in position by nuts 65 threaded thereupon.

The mirror 62 is disposed at such angle as to reflect the beam laterally against a second mirror 66 mounted upon an arm 67a corresponding to arm 63 and like the latter secured in support 64. This mirror is so disposed as to reflect the beam against the tiltable mirror 47 adjacent to one end thereof.

A mirror 67 is disposed below mirror 47 approximately in parallelism with respect thereto and is supported by a bracket 68 secured upon support 64 by screw 69. This mirror receives the reflected beam from the movable or tiltable mirror and the beam is then reflected back against the movable mirror and thus traverses the length of the two mirrors in a zigzag path. The number of reflections which the beam receives when passing along the two mirrors of course will depend upon the angle at which it is reflected against the mirror 47 by the mirror 66. By adjustment of the position of the latter mirror the number of these reflections may be decreased or increased at will. If the mirror 47 is tilted by reason of the action of the diamond point upon a plate 15 of glass disposed upon the supporting tips 14, it will be apparent that the angular shift of the beam will have added to it at each reflection from the moving mirror twice the angular deviation of the latter. Accordingly, the magnification of the angle rotation of the mirror 47 may be increased or decreased at will by increasing or decreasing the number of such reflections.

A mirror 70 disposed aslant with respect to both lateral and longitudinal axes of mirror 47, upon a bracket 71, projecting from beam 23 at the end of the latter mirror opposite to the mirror 66, functions to reflect the beam of light after it has passed between mirrors 47 and 67 forwardly in approximate parallelism to the beam 20. It will be apparent that by reason of the slant of the mirror 70 with respect to the two axes of mirror 47, the beam upon oscillation of mirror 47 instead of vibrating in a vertical plane will move in an oblique plane. Accordingly, for purposes of correcting for such deviation, a prism 72 supported upon bracket 73 carried by beam 23 is disposed in the path of the beam in such plane as to correct for obliquity of the path of vibration of the beam.

For purposes of increasing the length or path of travel of the beam and therefore increasing the magnification of the displacement of the beam created by tilting of mirror 47 a mirror 74 is secured upon a bracket 75 at the forward extremity of the beam 23. Mirror 74 is disposed at such an angle as to reflect the incident beam rearwardly against a mirror 76 which is secured upon a bracket 77 supported by beam 23 disposed intermediate prism 72 and mirror 74, and the latter mirror is so disposed as to reflect the beam or ray forwardly against an arcuate film holder 78, the center of curvature of which coincides with the axis of shaft 16. Mirror 74 may be removed to reduce the vertical magnification. By adjustment of lens 58 a small image of the pinhole 56 is focused on the film. In the foregoing optical system mirrors and prisms are to be considered as equivalent reflecting devices and the term mirror includes both.

In order to oscillate main beam 20 and auxiliary beam 23 about their vertical axis, shaft 16 at its lower extremity is provided with a horizontal fixed arm 79 at the extremity of which is vertically disposed pin 81. A cord 82 is secured to this pin and is trained about shives 83 secured to any convenient support. The cord is further trained about a pulley 84 upon the shaft of a suitable speed-reducing mechanism 86 which is driven by means of a motor (not shown).

The mode of operation of the apparatus involves the disposition of a plate of glass upon the points of the levelling screws 12 in a position as nearly perpendicular to the axis of shaft 16 as can be obtained. The diamond tip or point 51 is then brought lightly into contact with the under surface of the glass by adjusting screw 33 to raise or lower mirror 47 and its position with respect to any particular feature of a plate of glass which is to be examined, can readily be ascertained merely by looking through the glass from above. If desired, a microscope or other magnifying instrumentality may be employed for purposes of securing more accurate location of the diamond tip.

The beam of light from the source 54 is then projected through prism 60 and reflected from mirrors 62 and 66 upon moving mirror 47. The beam is reflected backward and forward in zigzag course between mirrors 47 and 67 until eventually it strikes the mirror 70 and is reflected by the latter through prism 72 and against mirrors 74 and 76 and finally strikes the film in the holder 78. If the movable mirror is at rest the path of the beam between mirrors 47 and 66 will lie in a plane parallel to or coinciding with the axis of rotation of the former mirror. As the moving mirror oscillates, the plane of the beam will shift back and forth. As previously stated any angular movement of the beam of light about the axis of rotation of the mirror 47 produced by tilting of the latter is increased by twice the angular shift of the mirror 47 at each reflection from the latter. This multiplication of the angle of displacement when multiplied by the length of the path from the moving mirror to the film results in enormous vertical magnification of the displacement of the diamond point. Magnifications up to five or six thousand or more are easily attained.

When the plate of glass is disposed upon the levelling screws and the beam of light is concentrated upon the film in holder 78 the driving motor is actuated to cause the beams 20 and 23 to rotate at uniform rate about their axis and thus to cause the diamond point to trace a path along the surface of the glass. Irregularities in the surface of the glass plate cause the diamond point to be elevated or depressed and thus to tilt mirror 47 and elevate or depress the beam of light as it traverses the sensitive film. The path of the beam is thus permanently recorded upon the latter.

If it is desired to trace a number of parallel accurately spaced profiles from which can be made a topographic or three-dimensional study of the surface screw 25 may be adjusted to rotate beam 23 about its pivot pin 24 upon main beam 20. Such rotation of course causes the diamond point to swing toward or away from the axis of main shaft 16 so that a new path can be traced. The head of screw 25 can be micrometrically calibrated so that the spacing of the paths can be determined with a high degree of precision.

The horizontal amplification of the trace of the diamond point is of course the ratio between the distances respectively from the diamond point and the film holder 78 to the axis of main shaft 16. This may be adjusted by loosening clamping screw 21 and sliding beam 20 forwardly or backwardly upon shaft 16 and then retightening the screw.

What I claim is:

1. Apparatus for determining the profile of a plane surface, comprising means to support a body having a surface to be tested in a suitable plane, a beam mounted to rotate in an arc in a plane parallel to said surface about an axis perpendicular to the surface, a tracing point mounted upon the beam in offset relation with respect to the axis of rotation thereof and being movable toward or away from the surface and means connected to the point to indicate on a magnified scale movements of the point toward and away from the surface and means for rotating the beam about its axis in order to cause the point to trace an arcuate path upon the surface.

2. A construction as defined in claim 1 in which the point is mounted upon a member constituting a cantilever support, the member in turn being mounted to tilt about an axis in a plane approximately perpendicular to the axis of the beam.

3. A construction as defined in claim 1 in which the point is mounted upon a member constituting a cantilever support, the support being carried by torsion filaments providing an axis in a plane perpendicular to the axis of the beam, the filaments being carried by the beam.

4. A construction as defined in claim 1 in which the point is secured to a mirror, the mirror being supported to rotate about an axis fixed to the rotatable beam, means to project a beam of light upon the mirror and means to record the oscillations of the beam caused by rotation of the mirror about its axis.

5. A construction as defined in claim 1 in which the point is carried upon a rotatable mirror which is supported upon tensioned filaments constituting an axis and resiliently urging the point into contact with the surface to be examined.

6. A construction as defined in claim 1 in which the point is relatively rigidly secured to a mirror mounted to rotate about an axis fixed with respect to the rotatable beam, a second mirror disposed in approximate parallelism to the first mirror and being fixed with respect to the beam, means to project a ray of light upon the rotatable mirror adjacent to one end thereof at such angle that the light is reflected backward and forth between the two mirrors in a path the plane of which approximately parallels the axis of the moving mirror and means to receive the beam after it has passed beyond the ends of the mirror and to record the movements thereof.

7. A construction as defined in claim 1 in which the point is rigidly secured to a mirror mounted to rotate about an axis upon the beam, means to project a ray of light to intersect the line of the axis of rotation of the beam, means disposed at said axis to project the ray along said axis against the rotatable mirror and a reflector to receive the ray after reflection from the mirror and to reflect it upon means to record oscillations of the ray produced by oscillations of the rotatable mirror.

8. A construction as defined in claim 1, in which the point is mounted upon a mirror mounted to rotate about an axis fixed with respect to the swinging beam, a second mirror disposed in approximate parallelism to the rotatable mirror, the second mirror being fixed with respect to the swingable beam, means to project a ray of light upon the rotatable mirror at a point adjacent to one end thereof, said means comprising a fixed reflector disposed to reflect a ray of light axially of the axis rotation of the swinging beam, means fixed upon the swinging beam to reflect the ray laterally to clear the edge of the second mirror and means to then reflect the ray against the movable mirror and a source of light disposed to project a ray against the reflector at such angle that it is projected coaxially of the axis of the rotation of the swinging beam.

9. A construction as defined in claim 1 in which an auxiliary carrying member is mounted to rotate about a pivot upon the beam, the pivot being disposed in offset relation with respect to the tracing point.

10. Apparatus for determining the profile of a plane surface comprising means to support a body having a surface to be tested in a suitable plane, a carrier member mounted to move in a plane parallel to the surface, an auxiliary carrier member mounted to move upon the main carrier member, a tracing point mounted upon the auxiliary carrier member, to follow the contour of the surface to be examined, means to record movements of the point toward and away from the surface and micrometer means for adjusting the position of the auxiliary carrier member upon the main carrier member to admit of tracing a series of parallel topographical lines upon the surface.

11. A construction as defined in claim 10 in which the main carrier member is secured to rotate upon a shaft vertical to the surface to be tested, the axis of which is disposed in offset relation with respect to the tracing point.

12. A construction as defined in claim 10 in which the main carrier member is fixed upon a shaft vertical to the surface to be tested, the axis of which is disposed in offset relation with respect to the tracing point and the auxiliary carrier member is mounted to rotate about a pivot upon the main carrier member, the pivot being disposed in offset relation with respect to the carrier member.

13. Apparatus as defined in claim 1 in which the recording means comprises a mirror rigidly secured to the tracing point and rotatable about an axis fixed with respect to the beam, means to project a beam of light against the mirror, means to receive the reflected beam and to project it in approximate parallelism to the plane of rotation of the carrier beam and an arcuate holder for photosensitive film, the holder having the axis corresponding to the axis of rotation of the carrier beam.

14. Apparatus for determining the profile of a plane surface comprising means to support a body having a surface to be tested in a horizontal plane, a beam secured for rotation upon a shaft vertical to the surface to be tested, and in a plane spaced from and parallel to said surface, a second beam mounted upon the first-mentioned beam, a tracing point carried upon the second beam in offset relation with respect to the shaft and being resiliently supported in contact with said surface, means to indicate movement of the point, the second beam being movable upon the first-mentioned beam to vary the position of the trace of the point upon the surface whereby to admit of making a series of spaced topographic traces upon the surface.

MANSON L. DEVOL.